(12) United States Patent
Heitz (10) Patent No.: US 11,878,766 B1
(45) Date of Patent: Jan. 23, 2024

(54) CRANK ASSEMBLY FOR A BICYCLE

(71) Applicant: Lance A Heitz, Presque Isle, MI (US)

(72) Inventor: Lance A Heitz, Presque Isle, MI (US)

( * ) Notice: Subject to any disclaimer, the term of this patent is extended or adjusted under 35 U.S.C. 154(b) by 0 days.

(21) Appl. No.: 18/196,322

(22) Filed: May 11, 2023

Related U.S. Application Data (63) Continuation-in-part of application No. 17/857,005, filed on Jul. 3, 2022.

(51) Int. Cl.
| | | |
|---|---|---|
| *B62M 6/50* | (2010.01) | |
| *B62M 6/55* | (2010.01) | |
| *F16H 9/04* | (2006.01) | |
| *F16H 35/02* | (2006.01) | |

(52) U.S. Cl.
CPC ............ *B62M 6/50* (2013.01); *B62M 6/55* (2013.01); *F16H 9/04* (2013.01); *F16H 35/02* (2013.01)

(58) Field of Classification Search
CPC .......... B62M 6/50; B62M 6/55; B62M 9/085; F16H 9/04; F16H 35/02
See application file for complete search history.

(56) References Cited

U.S. PATENT DOCUMENTS

| | | | | | |
|---|---|---|---|---|---|
| 4,193,324 | A | * | 3/1980 | Marc | B62M 11/145 475/349 |
| 4,706,516 | A | * | 11/1987 | Xi | B62M 3/04 74/594.1 |
| 5,882,025 | A | * | 3/1999 | Runnels | B62M 9/08 280/259 |
| 9,255,629 | B2 | * | 2/2016 | Yang | B62M 1/105 |
| 2005/0263978 | A1 | * | 12/2005 | Ascher | B62M 9/08 280/261 |
| 2006/0027994 | A1 | * | 2/2006 | Misevski | B62M 3/06 280/259 |
| 2006/0211529 | A1 | * | 9/2006 | Vergara | B62M 9/08 474/152 |
| 2007/0246908 | A1 | * | 10/2007 | Shu | B62M 9/00 280/261 |
| 2012/0214629 | A1 | * | 8/2012 | Earle | B62M 9/105 474/152 |
| 2014/0210179 | A1 | * | 7/2014 | Sprague | B62M 1/26 280/261 |

* cited by examiner

*Primary Examiner* — Tony H Winner
(74) *Attorney, Agent, or Firm* — Weiner & Burt PC; Irving M Weiner; Pamela S Burt (57) ABSTRACT

A crank assembly for a bicycle includes a crank axle, crank arms mounted to the crank axle to rotate the crank axle, a carrier shaft slidably mounted on the crank axle and configured to slide relative to the crank axle, and a sprocket mounted on the carrier shaft. A position sensor determines a relative position of a diametric axis of the sprocket relative to a central longitudinal axis of the crank arm at an end of a power stroke. Further, an actuator is operatively coupled to the carrier shaft to slide the carrier shaft, and a controller is configured to actuate the actuator to slide the carrier shaft relative to the crank axle based on input from the position sensor to change a start time of the power stroke of the sprocket.

21 Claims, 5 Drawing Sheets

CRANK ASSEMBLY FOR A BICYCLE

CROSS REFERENCE TO RELATED APPLICATIONS

The present patent application is a continuation-in-part of and claims priority from U.S. patent application Ser. No. 17/857,005 filed Jul. 3, 2022.

TECHNICAL FIELD

The present disclosure relates, generally, to a crank assembly for a bicycle and more particularly relates to a crank assembly for a bicycle that enables a change in a start time of a power stroke of the bicycle.

BACKGROUND

Conventional bicycles include a normally tubular frame with a front wheel capable of being steered by a handlebar, as well as a rear wheel. The rear wheel is driven by a chain that extends around a sprocket driven by pedals mounted on cranks. The sprocket is a generally a circular sprocket having a pedal stroke that begins when the crank is at a vertical upward position, providing a less than optimal power transfer to the bicycle. To overcome this, use of oval or elliptical sprocket is increasing. However, the oval or elliptical sprocket also has less than optimal power stroke when the bicycle is moving on an inclined terrain. Therefore, there is a need for a mechanism that maintains an optimal power stroke of the bicycle even during movement over the inclined terrain.

SUMMARY

In accordance with one embodiment, a crank assembly for a bicycle is provided. The crank assembly includes a crank axle having a central axis and configured to rotate about the central axis, and a pair of crank arms mounted to the crank axle and arranged on opposite ends of the crank axle. The pair of crank arms are configured to facilitate the rotation of the crank axle. The crank assembly further includes a carrier shaft slidably mounted on the crank axle and configured to slide in a direction substantially parallel to the central axis of the crank axle and relative to the crank axle. Moreover, the crank assembly includes a sprocket mounted on the carrier shaft. The sprocket rotates to move the bicycle in response to a rotation of the crank axle. Furthermore, the crank assembly includes a position sensor to determine a relative position of a diametric axis of the sprocket relative to a central longitudinal axis of at least one crank arm of the pair of crank arms at an end of a power stroke of the sprocket, and an actuator operatively coupled to the carrier shaft and configured to slide the carrier shaft relative to the crank axle. The crank assembly further includes a controller arranged in communication with the position sensor and the actuator and configured to actuate the actuator to slide the carrier shaft relative to the crank axle based on input from the position sensor to change a start time of the power stroke of the sprocket.

In this manner, the crank assembly facilitates a start of the bicycle rider's power stroke perpendicular to the direction (force) of the earth's gravity as the bicycle travels up and down hills by advancing and delaying the start timing of the power stroke by rotating the carrier shaft and hence the sprocket relative to crank axle. Accordingly, the mechanism provides the mechanical advantage to the bicycle rider and reduces the fatigue of the rider, keeping the rider's effort more constant, and keeping pedaling cadence unaffected by the directional changes in the earth's gravity while pedaling up and down changes in elevation. Also, the above mechanism allows a use of asymmetric elliptical bicycle sprocket on the bicycle without affecting the bicycle ride's particular pedaling cadence.

In some embodiments, the crank axle includes a spiral slot defined along an outer surface of the crank axle, and the carrier shaft includes a key extending inside the slot, wherein the carrier shaft rotates about the central axis of the crank axle in response to the sliding of the carrier shaft relative to the crank axle to change the start time of the power stroke of the sprocket.

In some embodiments, the actuator includes an electric motor, a screw adapted to be rotated by the electric motor, and a lever operatively coupled to the screw and engaged with the carrier shaft. The lever moves along the central axis of the crank axle in response to the rotation of the screw to cause the sliding of the carrier shaft relative to the crank axle.

In some embodiments, the crank assembly further comprises a bracket adapted to mount the crank assembly to a frame of the bicycle. The crank axle is rotatably coupled to the bracket.

In some embodiments, the sprocket is an elliptical sprocket and the diametric axis of the sprocket is a major axis of the elliptical sprocket.

In some embodiments, an angular orientation of the diametric axis of the sprocket relative to the central longitudinal axis of the at least one crank arm is changed in response to the sliding to the carrier shaft relative to the crank axle.

In some embodiments, the crank assembly further includes an inclination sensor to determine an inclination of a terrain of travel of the bicycle, and the controller is configured to actuate the actuator based on input from the inclination sensor.

In accordance with one embodiment a bicycle is disclosed. The bicycle includes a frame, a front wheel and a rear wheel supported on the frame, and a crank axle having a central axis and configured to rotate about the central axis. The bicycle also includes a pair of crank arms mounted to the crank axle and arranged on opposite ends of the crank axle. The pair of crank arms are configured to facilitate the rotation of the crank axle. Moreover, the bicycle includes a carrier shaft slidably mounted on the crank axle and configured to slide in a direction substantially parallel to the central axis of the crank axle and relative to the crank axle, and a sprocket mounted on the carrier shaft. The sprocket rotates to move the bicycle in response to a rotation of the crank axle. The bicycle further includes an inclination sensor to determine an inclination of a terrain of travel of the bicycle, and a position sensor to determine a relative position of a diametric axis of the sprocket relative to a central longitudinal axis of at least one crank arm of the pair of crank arms at an end of a power stroke of the sprocket. Furthermore, the bicycle includes an actuator operatively coupled to the carrier shaft and configured to slide the carrier shaft relative to the crank axle, and a controller arranged in communication with the inclination sensor, the position sensor, and the actuator and configured to actuate the actuator to slide the carrier shaft relative to the crank axle based on input from the inclination sensor and position sensor to change a start time of the power stroke of the sprocket.

In some embodiments, the crank axle includes a spiral slot defined along an outer surface of the crank axle, and the carrier shaft includes a key extending inside the slot. The carrier shaft rotates about the central axis of the crank axle in response to the sliding of the carrier shaft relative to the crank axle to change the start time of the power stroke of the sprocket.

In some embodiments, the actuator includes an electric motor, a screw adapted to be rotated by the electric motor, and a lever operatively coupled to the screw and engaged with the carrier shaft. The lever moves along the central axis in response to the rotation of the screw to cause the sliding of the carrier shaft relative to the crank axle.

In some embodiment, the bicycle further comprises a bracket adapted to mount the crank assembly to the frame of the bicycle. The crank axle is rotatably coupled to the bracket.

In some embodiments, the sprocket is an elliptical sprocket and the diametric axis of the sprocket is a major axis of the elliptical sprocket.

In some embodiments, an angular orientation of the diametric axis of the sprocket relative to the central longitudinal axis of the at least one crank arm is changed in response to the sliding to the carrier shaft relative to the crank axle.

According to yet another aspect of the disclosure, a crank assembly for a bicycle is disclosed. The crank assembly includes a bracket adapted to be coupled to a frame of the bicycle to enable a mounting of the crank assembly to the frame, and a crank axle rotatably mounted to the bracket and having a central axis and configured to rotate about the central axis. The crank assembly also includes a pair of crank arms mounted to the crank axle and arranged on opposite ends of the crank axle. The pair of crank arms are configured to facilitate the rotation of the crank axle. Further, the crank assembly includes a carrier shaft slidably mounted on the crank axle and configured to slide in a direction substantially parallel to the central axis of the crank axle and relative to the crank axle. Moreover, the crank assembly includes a sprocket mounted on the carrier shaft. The sprocket rotates to move the bicycle in response to a rotation of the crank axle. Furthermore, the crank assembly includes an inclination sensor to determine an inclination of a terrain of travel of the bicycle, and a position sensor to determine a relative position of a diametric axis of the sprocket relative to a central longitudinal axis of at least one crank arm of the pair of crank arms at an end of a power stroke of the sprocket. The crank assembly also includes an actuator operatively coupled to the carrier shaft and configured to slide the carrier shaft relative to the crank axle, and a controller arranged in communication with the inclination sensor, the position sensor, and the actuator and configured to actuate the actuator to slide the carrier shaft relative to the crank axle based on input from the inclination sensor and position sensor to change a start time of the power stroke of the sprocket.

In some embodiments, the crank axle includes a spiral slot defined along an outer surface of the crank axle, and the carrier shaft includes a key extending inside the slot. The carrier shaft rotates about the central axis of the crank axle in response to the sliding of the carrier shaft relative to the crank axle to change the start time of the power stroke of the sprocket.

In some embodiments, the actuator includes an electric motor, a screw adapted to be rotated by the electric motor, and a lever operatively coupled to the screw and engaged with the carrier shaft. The lever moves along the central axis of the crank axle in response to the rotation of the screw to cause the sliding of the carrier shaft relative to the crank axle.

In some embodiments, the sprocket is an elliptical sprocket, and the diametric axis of the sprocket is a major axis of the elliptical sprocket.

In some embodiments, an angular orientation of the diametric axis of the sprocket relative to the central longitudinal axis of the at least one crank arm is changed in response to the sliding to the carrier shaft relative to the crank axle.

DETAILED DESCRIPTION

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc., mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Figure 1:
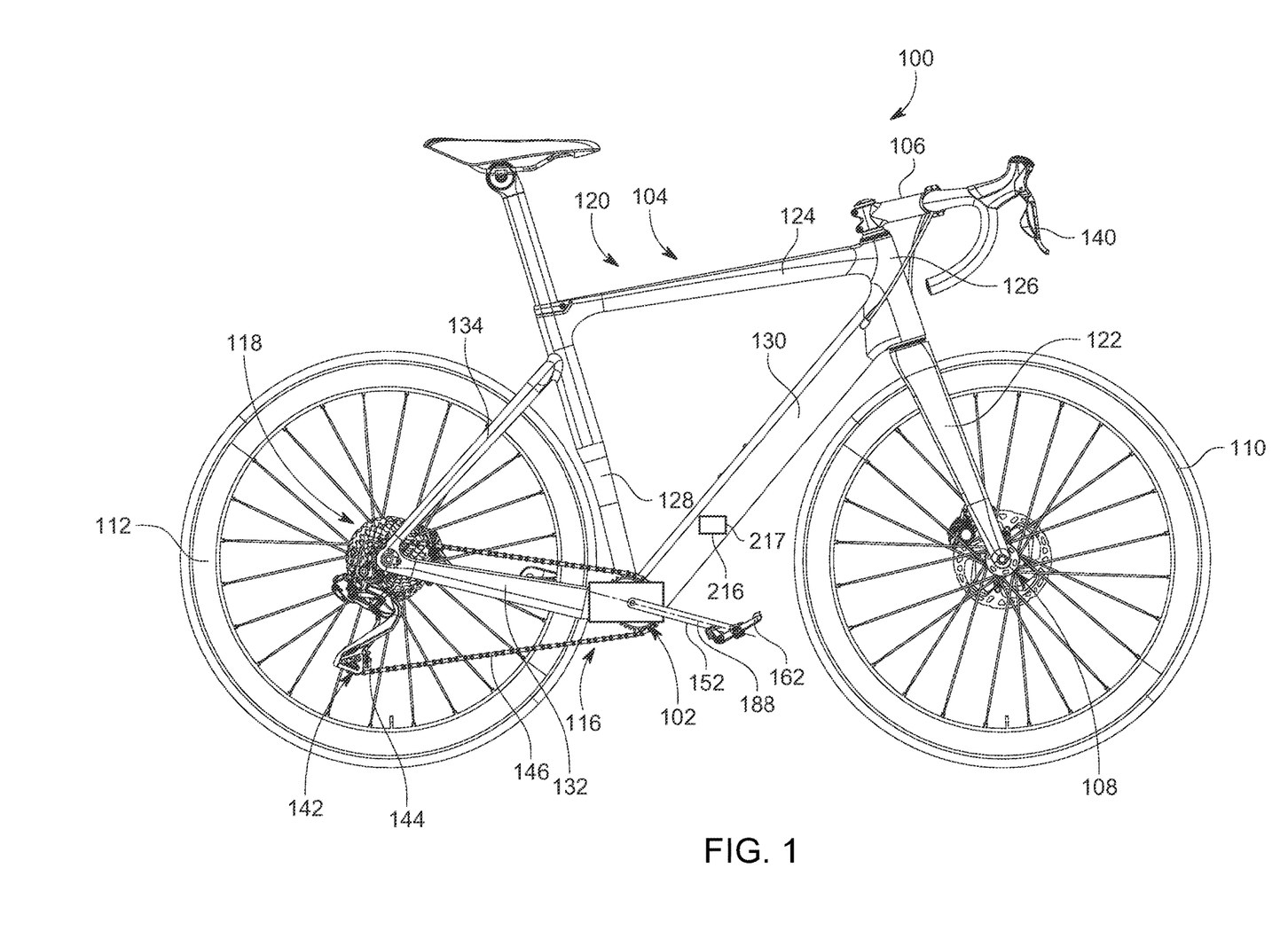
FIG. 1 illustrates a side view of an example bicycle having a crank assembly, in accordance with an embodiment of the disclosure.

Referring to FIG. 1, a bicycle 100 having a crank assembly 102 that allows for adjusting a timing of a power stroke of pedaling of the bicycle 100 according to an inclination of a terrain relative to the ground and a direction of travel on the inclined terrain is shown. The bicycle 100 includes a frame 104, a handlebar 106, a front hub assembly 108, a front wheel 110, a rear wheel 112, a driving portion 116 (including the crank assembly 102 and, a rear hub assembly 118).

The frame 104 includes a frame body 120 and a front fork 122. The frame body 120 includes a top tube 124, a head tube 126, a seat tube 128, a down tube 130, a pair of chain stays 132, and a pair of seat stays 134. The front fork 122 is rotatably attached to the head tube 126 of the frame body 120, and the handlebar 106 is fixed to the front fork 122.

The front hub assembly 108 is supported on the front fork 122, and the front wheel 110 is rotatably attached to the front fork 122 through the front hub assembly 108. The rear wheel 112 is rotatably attached to a rear portion of the frame 104 (i.e., the frame body 120) through the rear hub assembly 118.

Further, the bicycle 100 includes a pair of brake levers 140 to be manipulated by a rider of the bicycle to apply front and rear brake devices (not shown) of the bicycle 100. Further, the bicycle 100 includes a gear change portion 142 having a derailleur 144 and attached to the frame 104 (the frame body 120). The derailleur 144 moves a bicycle chain 146 from a rear sprocket to an adjacent rear sprocket upon a shift operation of a shift lever (not shown) attached to the handlebar 106. The crank assembly 102 is fixedly supported/attached to the frame 104 at a junction of the down tube 130 and the seat tube 128. To enable the attachment of the crank assembly 102 with the frame 104, the crank assembly 102 may include a bracket 147 having a pair of keeper plates 148*a*, 148*b* coupled on both sides of the frame 104, for example, a right keeper plate 148*a* is coupled on a right side of the frame 104 and a left keeper plate 148*b* is coupled on a right side of the frame 104. The bracket 147 further includes a U-shaped cover plate 149 coupled to the pair of keeper plates 148*a*, 148*b* to protect various components of the crank assembly 102 and extending downwardly from the keeper plates 148*a*, 148*b*. The keeper plates 148*a*, 148*b* may be coupled to the cover plate 149 via a set of screws. By using the bracket 147, the crank assembly 102 may be retrofitted to any bicycle without modifying the frame 104 of the bicycle 100. Although, the bracket 147 is contemplated for mounting the crank assembly 102 to the frame 104, it may be appreciated that the bracket 147 may be omitted, and the crank assembly 102 may be mounted to the frame 104 of the bicycle 100 by rotatably mounting a crank axle of the crank assembly 102 to the frame 104 as known in the art.

Figure 2:
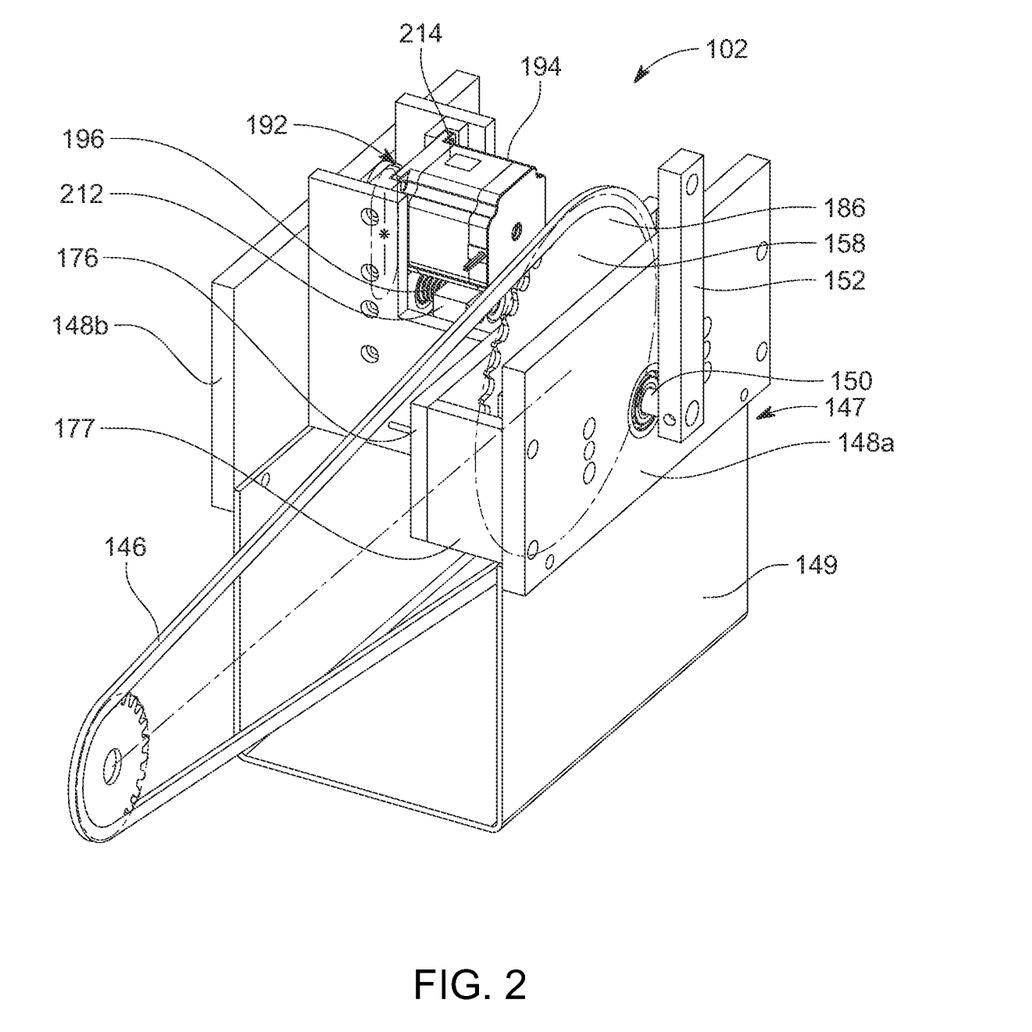
FIG. 2 illustrates a side perspective view of the crank assembly of FIG. 1, in accordance with an embodiment of the disclosure.
Figure 3:
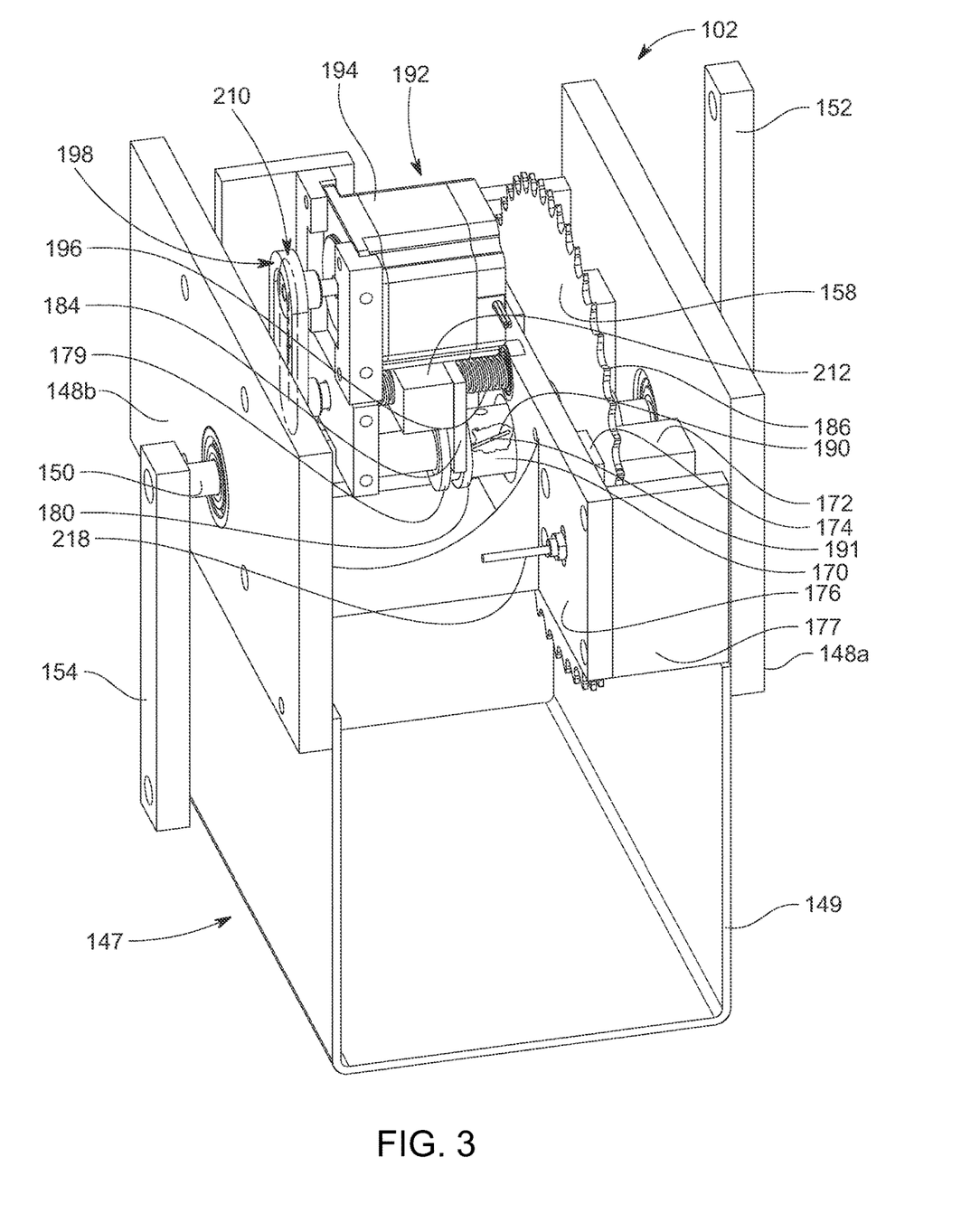
FIG. 3 illustrates a front perspective view of the crank assembly of FIG. 1, in accordance with an embodiment of the disclosure.
Figure 4:
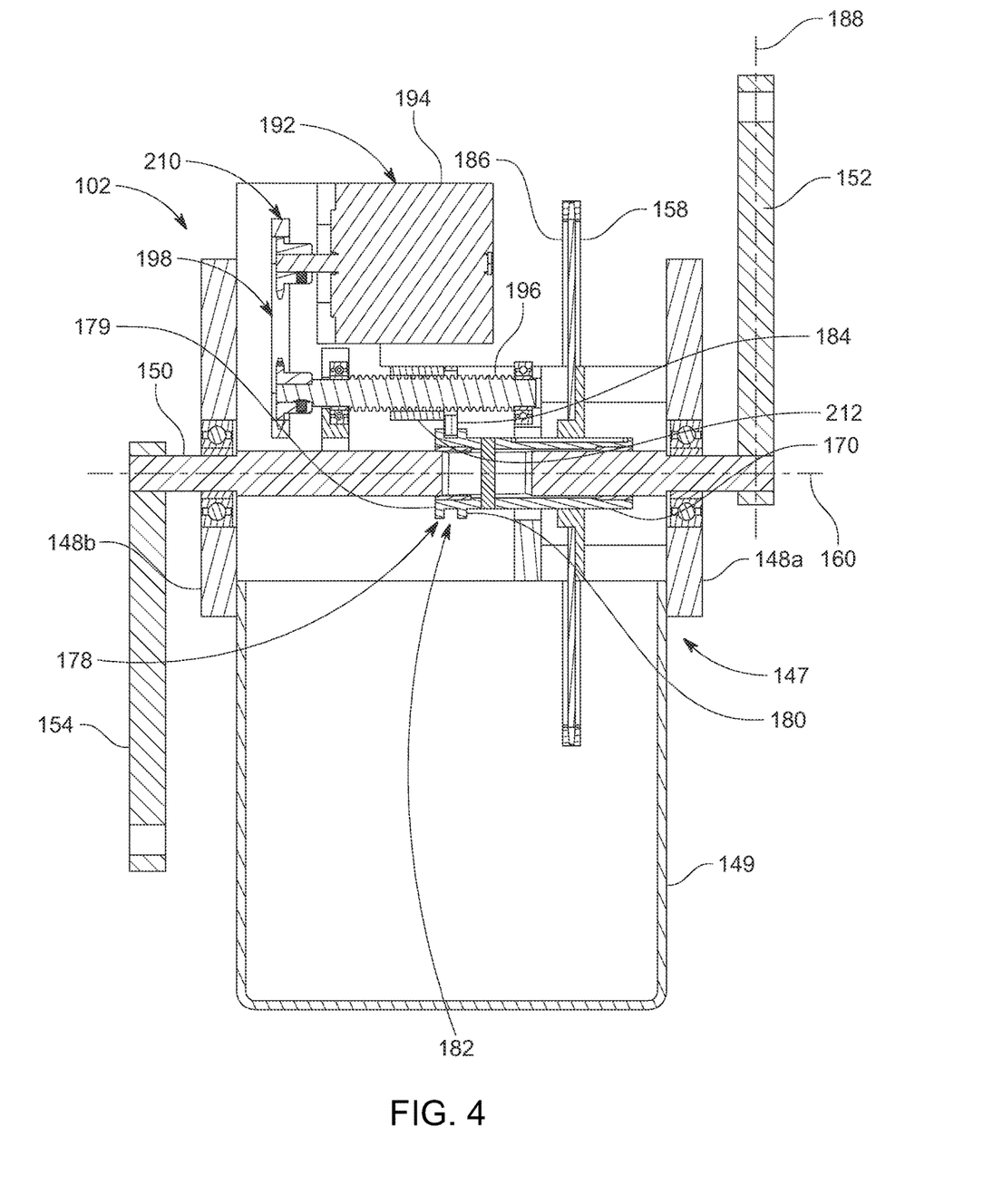
FIG. 4 illustrates a sectional view of the crank assembly of FIG. 1, in accordance with an embodiment of the disclosure.

Referring to FIGS. 2, 3, and 4, the crank assembly 102 includes a crank axle 150 (i.e., pedal shaft 150), a first crank arm 152 (i.e., right crank arm 152), and a second crank arm 154 (i.e., left crank arm 154), and a drive sprocket 158 mounted on the crank axle 150 and configured to rotate about a central longitudinal axis 160 i.e., central axis 160, of the crank axle 150 along with the crank axle 150 upon application of torque/force on the crank arms 152, 154. The right crank arm 152 and the left crank arm 154 are mounted on opposite ends of the crank axle 150. For example, a crank axle mounting portions of the left crank arm 154 is attached fixedly to one end of the crank axle 150, and a crank axle mounting portion of the right crank arm 152 is attached fixedly to the other end of the crank axle 150. As shown in FIG. 1, a first pedal 162 and a second pedal (not shown) are attached to pedal mounting portions of the right crank arm 152 and the left crank arm 154.

Moreover, the crank assembly 102 includes a carrier shaft 170 slidably mounted on the crank axle 150 and is adapted to slide relative to the crank axle 150 in a direction substantially parallel to the central axis 160 of the crank axle 150. The carrier shaft 170 is in the form of a hollow tube and is disposed coaxially to the crank axle 150 and is disposed between the right keeper plate 148*a* and the left keeper plate 148*b*. Further, the sprocket 158 is mounted on the carrier shaft 170 and is arranged coaxially to the carrier shaft 170. In an embodiment, the carrier shaft 170 may include a plurality of splines arranged at an outer surface of the carrier shaft 170 to enable the coupling of the sprocket 158 with the carrier shaft 170. As shown, the sprocket 158 is arranged proximate to the right keeper plate 148*a* and is arranged between a pair of stoppers 172, 174 (best shown in FIG. 3) to prevent any translation or movement of the sprocket 158 in a direction substantially parallel to the central axis 160. As best shown in FIG. 4, a first stopper 172 is attached to the right keeper plate 148*a*, while a second stopper 174 is attached to an intermediate plate 176 arranged spaced apart and substantially parallel to the right keeper plate 148*a*. The intermediate plate 176 is attached to the right keeper plate 148*a* via suitable plate members 177.

The carrier shaft 170 further includes a retention structure 178 having a first flange 179 and a second flange 180 extending radially outwardly from an outer surface of the body of the carrier shaft 170 and defining a gap 182 therebetween. The retention structure 178 facilitates an engagement of a lever 184 of the crank assembly 102 to the carrier shaft 170 to enable the sliding of the carrier shaft 170 on the crank axle 150 and relative to the crank axle 150. The lever 184 is mounted on the carrier shaft 170 at a location between the two flanges 179, 180. In an embodiment, the lever 184 is fixedly attached/mounted to the carrier shaft 170. The crank assembly 102 may also include a dowel pin to keep the carrier shaft 170 and the crank axle 150 in accurate/desired alignment.

As shown, the sprocket 158 is an elliptical sprocket 186 enabling a start of a power stroke of the bicycle 100 when the crank arm, i.e., the right crank arm 152 is arranged at a location different from its top position. Further, the crank assembly 102 also enables a shifting of the start timing of the power stroke of the bicycle 100 by changing a position or angular orientation of a diametric axis 200, for example, a major axis 202, shown in FIG. 5, of the elliptical sprocket 186 relative to a central longitudinal axis 188 of the right crank arm 152. Although the elliptical sprocket 186 is contemplated, it may be appreciated that the sprocket 158 may be a circular sprocket.

To enable such a change in the start timing of the power stroke of the bicycle 100, the crank axle 150 includes a spiral slot 190 extending in a curved manner along an outer surface of crank axle 150. Accordingly, instead of the slot 190 being in a straight line that is substantially parallel/aligned to the central axis 160 of the crank axle 150, the slot 190 moves arcuately about the central axis 160 along the outer surface of crank axle 150, and also extends linearly in the direction of the central axis 160. Accordingly, a projection of the slot 190 in a horizontal plane containing the central axis 160, when viewed from top, is inclined to and intersects with the central axis 160. Also, the carrier shaft 170 is engaged with the crank axle 150 by inserting a radial projection of the carrier shaft 170 or a key 191 inside the slot 190. Accordingly, as the carrier shaft 170 is slid along the central axis 160 by using the lever 184, the carrier shaft 170 also rotates about the central axis 160, causing a change in the angular position of the crank arm, for example, right crank arm 152, relative to the major axis 202 of the sprocket 158, resulting into a change in the start time of the power stroke of the bicycle 100 (i.e., elliptical sprocket 186). In this manner, by sliding the carrier shaft 170 in a first direction or a second direction opposite to the first direction, the start timing of the power stroke may be advanced or delayed. Although the crank axle 150 and the carrier shaft 170 are contemplated to include the slot 190 and the key 191, it may be appreciated that the crank axle 150 and the carrier shaft 170 may respectively include the key and the slot.

To facilitate changing of the start of the power stroke of the bicycle 100, the crank assembly 102 further includes an actuator 192 to slide the carrier shaft 170 on the crank axle 150 to change the start timing of the power stroke of the bicycle 100. As shown in FIGS. 2 to 4, the actuator 192 includes an electric motor 194, for example, a stepper motor, and a screw 196 operatively coupled to the motor 194 and the lever 184. A stepper motor operates in measured segments or steps of rotation, stepping the carrier shaft 170 into position. As shown, the screw 196, for example, a lead screw, is coupled to the motor 194 via a drive mechanism 198, for example, a belt drive 210, that rotates the screw 196 about its central axis in response to the rotation of the motor 194. Although the drive mechanism 198 is shown and contemplated as the belt drive 210, it may be appreciated that any other suitable drive, such as, but not limited to, gear drive, chain drive, etc., may also be used. Further, in some embodiments, drive mechanism 198 may be omitted and in such cases, the motor 194 is directly coupled to the screw 196. Further, to enable the translation of the lever in response to the rotation of the screw, the lever may be coupled to a nut 212 that translates in response to the rotation of the screw.

Further, the crank assembly 102 includes a controller 214, an inclination sensor 216, and a position sensor 218 to automatically actuate and control the operation of the actuator 192 in response to change in the angle of inclination of the terrain on which the bicycle 100 is being operated and the direction of travel of the bicycle 100. The inclination sensor 216 determines an angle of inclination of the terrain on which the bicycle 100 is moving. In some embodiments, the inclination sensor 216 may be electric protractor 217 and is mounted on the frame 104 of the bicycle 100. In such a case, the electric protractor 217 may be mounted at an angle, for example, 45 degrees angle, relative to a horizontal. Accordingly, the inclination angle of the terrain when the bicycle 100 is going uphill will add into the 45 degrees and thus the electronic protractor 217 measures the angle of inclination as the summation of the inclination angle of the terrain and 45 degrees. Similarly, the inclination angle of the terrain when the bicycle 100 is going downhill will subtract from 45 degrees and the angle of inclination measured by the electronic protractor 217 is less than 45 degrees. Accordingly, based on the input provided by the electronic protractor 217, the controller 214 determines the angle of inclination of the terrain on which the bicycle 100 is moving as well as the direction of movement of the bicycle 100 i.e., the uphill or downhill movement of the bicycle 100. In some embodiments, the inclination sensor 216 may be mounted on the bracket 147, and in such a case, a direction sensor (not shown) may be utilized to ascertain whether the bicycle 100 is travelling uphill or downhill.

Further, the position sensor 218 determines an angular orientation of the major axis 202 relative to the central longitudinal axis 188 of the crank arm 152 at an end of the power stroke of the bicycle 100. In an embodiment, the position sensor 218 is configured to monitor a position or an angular orientation of a protrusion extending from the sprocket 158 and based on the angular orientation of the protrusion, the controller 214 is configured to determine the angular orientation of the major axis 202 i.e., diametric axis, relative to the central longitudinal axis 188. To ensure power supply to the controller 214, the motor 194, and other electrical or electronic components of the crank assembly 102, a power source, such as, battery may be used. The controller 214 is arranged in communication with the actuator 192 (i.e., motor 194), the inclination sensor 216, and the position sensor 218. Based on the inputs received from one or more sensors 216, 218, the controller 214 may actuate the motor 194 (i.e., actuator) to operate the lever 184 to suitably slide and angularly position the carrier shaft 170 to adjust the start timing of the power stroke of the bicycle 100. The controller 214 determines the amount of rotation of the stepper motor (i.e., motor 194) and hence the sliding and rotation of the carrier shaft 170 based on the input from the inclination sensor 216, and starts/initiates the rotation of the stepper motor (i.e., the motor 194) and hence the sliding and rotation of the carrier shaft 170 relative to the crank axle 150 based on the input from the position sensor 218. In some embodiments, the inclination sensor 216 i.e., the electric protractor 217 may be omitted, and in such a case, the controller 214 may actuate the actuator 192 i.e., the motor 194 to change the start timing of the power stroke of the bicycle 100 based on input from the position sensor 218 only.

Figure 5:
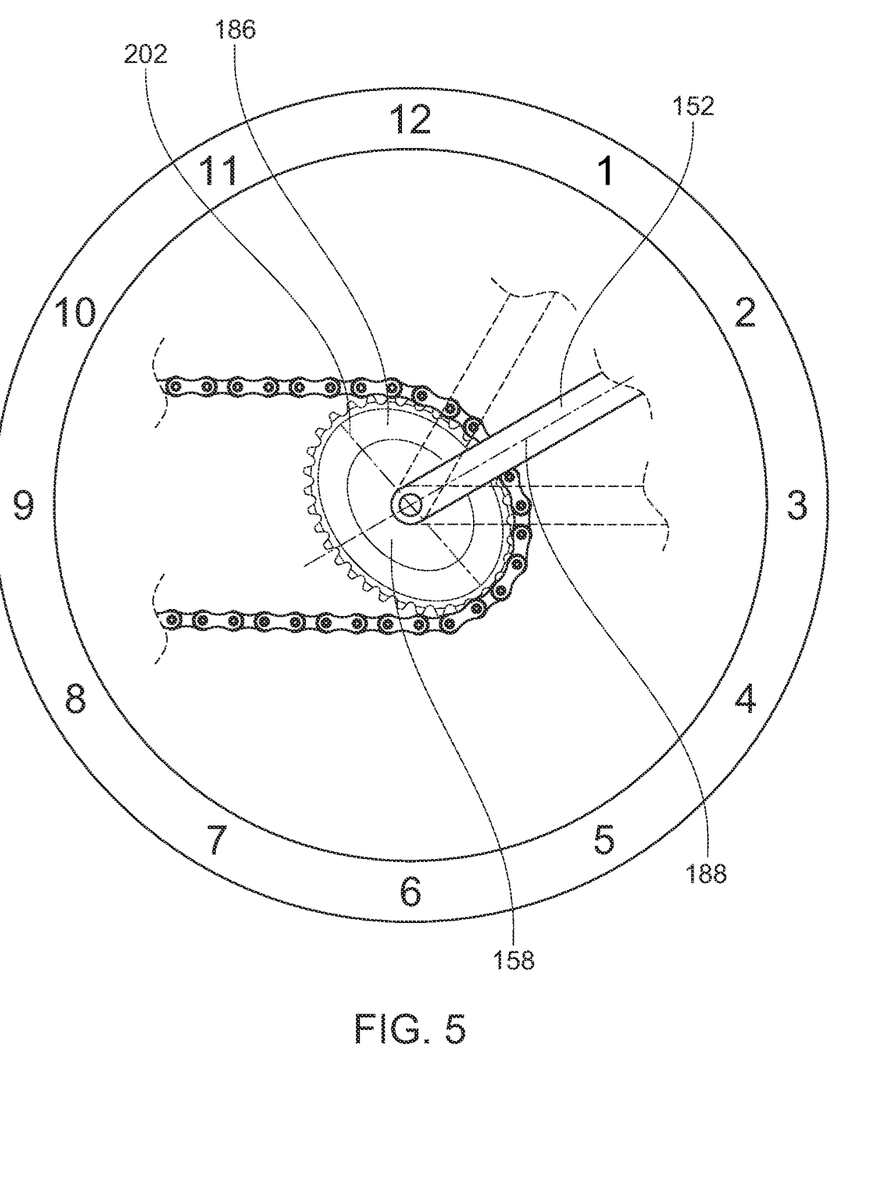
FIG. 5 depicts a timing diagram depicting timing of a power stroke of the bicycle having the crank assembly, in accordance with an embodiment of the disclosure.

In an exemplary scenario, as shown in FIG. 5, during the movement of the bicycle 100 on a horizontal ground, the power stroke of the bicycle 100 begins when the central longitudinal axis 188 of the right crank arm 152 is at 2, considering one full circle of the revolution of the right crank arm 152 as a clock face. Accordingly, the start time of the power stroke corresponds to 60 degrees angle of the right crank arm 152 from a vertically upward position. It is desirable to change the start time of the power stroke of the bicycle 100 during uphill or downhill movement of the bicycle 100 to maintain the proper power zone location relative to the force of gravity independent of the bicycle frame's 104 (i.e., frame body 120) changing inclination with the inclination of the road.

Accordingly, the controller 214 adjusts the start time of the power stroke of the bicycle 100 during the uphill movement and downhill movement depending on the inclination of the road/terrain as well as direction of travel i.e., uphill or downhill movement. For so doing, during uphill movement of the bicycle 100, the controller 214 determines a new start time (i.e., angle of the right crank arm 152 i.e., angle of the central longitudinal axis 188 from the vertically upward position) based on the inclination angle and direction of movement of the bicycle 100 measured by the inclination sensor 216. Further, controller 214 determines a timing/condition to change the start timing of the power stroke of the bicycle 100 based on the angular orientation of the major axis 202 relative to the central longitudinal axis 188 of the crank arm 152 at an end of the power stroke of the bicycle 100 which is determines based on the input received from the position sensor 218. Based on the determined new start time of the power stroke, the controller 214 determines the rotation of the motor 194 and accordingly actuates the motor 194 to rotate the screw 196, and hence slides and rotates the carrier shaft 170 to position the carrier shaft 170 such that start time of the power stroke is delayed and the power stroke begins later relative to the start of the power stroke when the bicycle 100 is moving on a substantially horizontal path. Accordingly, in the illustrated example, shown in FIG. 5, the carrier shaft 170 is moved on the crank axle 150 such that the power stroke begins when the right crank arm 152 is positioned at a location corresponding to 3 on the clock face i.e., the right crank arm 152 subtends 90 degrees angle relative to the vertical upward position, while going uphill. Similarly, during a downhill movement of the bicycle 100, the controller 214 rotates the motor 194 in order to slide and rotate the carrier shaft 170 relative to the crank axle 150 and positions the carrier shaft 170 such that start time of the power stroke is advanced and the power stroke begins earlier relative to the start of the power stroke when the bicycle 100 is moving on a substantially horizontal path. Accordingly, in the illustrated example, shown in FIG. 5, the carrier shaft 170 is moved on the crank axle 150 such that the power stroke begins when the right crank arm 152 is positioned/arranged/located at a location corresponding to 1 on the clock face i.e., the right crank arm 152 subtends 30 degrees angle relative to the vertical upward position, while going downhill. Accordingly, the crank assembly 102 of the bicycle 100 facilitate in maintaining the proper power zone location relative to the force of gravity independent of the bicycle frame's 104 (i.e., frame body 120) changing altitude/inclination.

As the bicycle 100 continuously moves on an uneven terrain, the inclination sensor 216 senses any change in the bicycle inclination and the position sensor 218 determines the angular orientation of the central longitudinal axis 188 of the right crank arm 152 relative to the major axis 202 at the end of the power stroke at the changed inclination. Based on these inputs from the sensors 216, 218 the controller 214 then rotates the motor 194 in order to incrementally rotate and reposition the carrier shaft 170 relative to the crank axle 150 to maintain the proper power zone continuously.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims.

What is claimed is:

1. A crank assembly for a bicycle, the crank assembly comprising:
   a crank axle having a central axis and configured to rotate about the central axis;
   a pair of crank arms mounted to the crank axle and arranged on opposite ends of the crank axle, the pair of crank arms are configured to facilitate the rotation of the crank axle;
   a carrier shaft slidably mounted on the crank axle and configured to slide in a direction substantially parallel to the central axis of the crank axle and relative to the crank axle;
   a sprocket mounted on the carrier shaft, wherein the sprocket rotates to move the bicycle in response to a rotation of the crank axle;
   a position sensor to determine a relative position of a diametric axis of the sprocket relative to a central longitudinal axis of at least one crank arm of the pair of crank arms at an end of a power stroke of the sprocket;
   an actuator operatively coupled to the carrier shaft and configured to slide the carrier shaft relative to the crank axle; and
   a controller arranged in communication with the position sensor and the actuator and configured to actuate the actuator to slide the carrier shaft relative to the crank axle based on input from the position sensor to change a start time of the power stroke of the sprocket.

2. The crank assembly of claim 1, wherein the crank axle includes a spiral slot defined along an outer surface of the crank axle, and the carrier shaft includes a key extending inside the slot, wherein the carrier shaft rotates about the central axis of the crank axle in response to the sliding of the carrier shaft relative to the crank axle to change the start time of the power stroke of the sprocket.

3. The crank assembly of claim 1, wherein the actuator includes
   an electric motor,
   a screw adapted to be rotated by the electric motor, and
   a lever operatively coupled to the screw and engaged with the carrier shaft wherein the lever moves along the central axis of the crank axle in response to the rotation of the screw to cause the sliding of the carrier shaft relative to the crank axle.

4. The crank assembly of claim 1 further comprising a bracket adapted to mount the crank assembly to a frame of the bicycle, wherein the crank axle is rotatably coupled to the bracket.

5. The crank assembly of claim 1, wherein the sprocket is an elliptical sprocket and the diametric axis of the sprocket is a major axis of the elliptical sprocket.

6. The crank assembly of claim 1, wherein an angular orientation of the diametric axis of the sprocket relative to the central longitudinal axis of the at least one crank arm is changed in response to the sliding to the carrier shaft relative to the crank axle.

7. The crank assembly of claim 1 further including an inclination sensor to determine an inclination of a terrain of travel of the bicycle, and the controller is configured to actuate the actuator based on input from the inclination sensor.

8. A bicycle, comprising:
   a frame;
   a front wheel and a rear wheel supported on the frame;
   a crank axle having a central axis and configured to rotate about the central axis;
   a pair of crank arms mounted to the crank axle and arranged on opposite ends of the crank axle, the pair of crank arms are configured to facilitate the rotation of the crank axle;
   a carrier shaft slidably mounted on the crank axle and configured to slide in a direction substantially parallel to the central axis of the crank axle and relative to the crank axle;
   a sprocket mounted on the carrier shaft, wherein the sprocket rotates to move the bicycle in response to a rotation of the crank axle;
   an inclination sensor to determine an inclination of a terrain of travel of the bicycle;
   a position sensor to determine a relative position of a diametric axis of the sprocket relative to a central longitudinal axis of at least one crank arm of the pair of crank arms at an end of a power stroke of the sprocket;
   an actuator operatively coupled to the carrier shaft and configured to slide the carrier shaft relative to the crank axle; and
   a controller arranged in communication with the inclination sensor, the position sensor, and the actuator and configured to actuate the actuator to slide the carrier shaft relative to the crank axle based on input from the inclination sensor and position sensor to change a start time of the power stroke of the sprocket.

9. The bicycle of claim 8, wherein the crank axle includes a spiral slot defined along an outer surface of the crank axle, and the carrier shaft includes a key extending inside the slot, wherein the carrier shaft rotates about the central axis of the crank axle in response to the sliding of the carrier shaft relative to the crank axle to change the start time of the power stroke of the sprocket.

10. The bicycle of claim 8, wherein the actuator includes
    an electric motor,
    a screw adapted to be rotated by the electric motor, and
    a lever operatively coupled to the screw and engaged with the carrier shaft, wherein the lever moves along the central axis of the crank axle in response to the rotation of the screw to cause the sliding of the carrier shaft relative to the crank axle.

11. The bicycle of claim 8 further comprising a bracket adapted to mount the crank assembly to the frame of the bicycle, wherein the crank axle is rotatably coupled to the bracket.

12. The bicycle of claim 8, wherein the sprocket is an elliptical sprocket and the diametric axis of the sprocket is a major axis of the elliptical sprocket.

13. The bicycle of claim 8, wherein an angular orientation of the diametric axis of the sprocket relative to the central longitudinal axis of the at least one crank arm is changed in response to the sliding to the carrier shaft relative to the crank axle.

14. A crank assembly for a bicycle, the crank assembly comprising:
    a bracket adapted to be coupled to a frame of the bicycle to enable a mounting of the crank assembly to the frame;
    a crank axle rotatably mounted to the bracket and having a central axis and configured to rotate about the central axis;
    a pair of crank arms mounted to the crank axle and arranged on opposite ends of the crank axle, the pair of crank arms are configured to facilitate the rotation of the crank axle;
    a carrier shaft slidably mounted on the crank axle and configured to slide in a direction substantially parallel to the central axis of the crank axle and relative to the crank axle;
    a sprocket mounted on the carrier shaft, wherein the sprocket rotates to move the bicycle in response to a rotation of the crank axle;
    an inclination sensor to determine an inclination of a terrain of travel of the bicycle;
    a position sensor to determine a relative position of a diametric axis of the sprocket relative to a central longitudinal axis of at least one crank arm of the pair of crank arms at an end of a power stroke of the sprocket;
    an actuator operatively coupled to the carrier shaft and configured to slide the carrier shaft relative to the crank axle; and
    a controller arranged in communication with the inclination sensor, the position sensor, and the actuator and configured to actuate the actuator to slide the carrier shaft relative to the crank axle based on input from the inclination sensor and position sensor to change a start time of the power stroke of the sprocket.

15. The crank assembly of claim 14, wherein an angular orientation of the diametric axis of the sprocket relative to the central longitudinal axis of the at least one crank arm is changed in response to the sliding to the carrier shaft relative to the crank axle.

16. The crank assembly of claim 14, wherein the actuator includes
    an electric motor,
    a screw adapted to be rotated by the electric motor, and
    a lever operatively coupled to the screw and engaged with the carrier shaft, wherein the lever moves along the central axis of the crank axle in response to the rotation of the screw to cause the sliding of the carrier shaft relative to the crank axle.

17. The crank assembly of claim 14, wherein the sprocket is an elliptical sprocket and the diametric axis of the sprocket is a major axis of the elliptical sprocket.

18. The crank assembly of claim 14, wherein the crank axle includes a spiral slot defined along an outer surface of the crank axle, and the carrier shaft includes a key extending inside the slot, wherein the carrier shaft rotates about the central axis of the crank axle in response to the sliding of the carrier shaft relative to the crank axle to change the start time of the power stroke of the sprocket.

19. The crank assembly of claim 18, wherein the sprocket is an elliptical sprocket and the diametric axis of the sprocket is a major axis of the elliptical sprocket.

20. The crank assembly of claim 18, wherein an angular orientation of the diametric axis of the sprocket relative to the central longitudinal axis of the at least one crank arm is changed in response to the sliding to the carrier shaft relative to the crank axle.

21. A bicycle apparatus comprising, in combination:
a bicycle for peddling over terrain; and
means connected to the bicycle for sensing attitude of the bicycle as it is peddled over the terrain and for maintaining direct linear control of a bicycle rider's pedaling motions, whereby the pedaling motions remain constant and consistent independent of the attitude of the bicycle, thereby strengthening the bicycle rider's riding performance.

* * * * *